US012724529B2

(12) United States Patent
Park et al.

(10) Patent No.: US 12,724,529 B2
(45) Date of Patent: Sep. 1, 2026

(54) ELECTRONIC DEVICE AND METHOD FOR SENSING ATTACHMENT OF USER INPUT DEVICE

(71) Applicant: Samsung Electronics Co., Ltd., Suwon-si (KR)

(72) Inventors: Seungjoon Park, Suwon-si (KR); Jinhui Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 18/973,793

(22) Filed: Dec. 9, 2024

(65) Prior Publication Data

US 2025/0103202 A1 Mar. 27, 2025

Related U.S. Application Data

(63) Continuation of application No. PCT/KR2023/006870, filed on May 19, 2023.

(30) Foreign Application Priority Data

Jul. 18, 2022 (KR) ........................ 10-2022-0088600
Aug. 22, 2022 (KR) ........................ 10-2022-0105102

(51) Int. Cl.
*G06F 3/0488* (2022.01)
*G06F 1/16* (2006.01)
(Continued)

(52) U.S. Cl.
CPC .......... *G06F 3/0488* (2013.01); *G06F 1/1656* (2013.01); *G06F 1/169* (2013.01); *G06F 3/046* (2013.01); *G06F 3/0484* (2013.01)

(58) Field of Classification Search
CPC ...... G06F 3/0488; G06F 3/046; G06F 3/0484; G06F 1/1656
See application file for complete search history.

(56) References Cited

U.S. PATENT DOCUMENTS 7,477,240 B2 1/2009 Yanagisawa
8,310,351 B2 11/2012 Krahenbuhi et al.
(Continued)

FOREIGN PATENT DOCUMENTS

KR 10-0556072 B1 3/2006
KR 10-0898868 B1 5/2009
(Continued)

OTHER PUBLICATIONS

International Search Report dated Sep. 13, 2023, issued in International Patent Application No. PCT/KR2023/006870.

*Primary Examiner* — Lisa S Landis
(74) *Attorney, Agent, or Firm* — Jefferson IP Law, LLP

(57) ABSTRACT

An electronic device is provided. The electronic device includes a display, memory storing one or more computer programs, and one or more processors communicatively coupled to the display and the memory, wherein the one or more computer programs include computer-executable instructions that, when executed by the one or more processors individually or collectively, cause the electronic device to display a user interface (UI) having a first size within a display region of the display, receive touch inputs contacted on the display region while the user interface is displayed, in response to the touch inputs, identify a first partial region of the display region, based on a pattern and/or position of contact points corresponding to the touch input on the display region, wherein the first partial region of the display region is positioned under an external electronic device on the display region, and in response to the identification, refrain from recognizing a touch input having a contact point within the first partial region, and display the user interface having a second size smaller than the first size, within a second partial region of the display region adjacent to the first partial region.

20 Claims, 12 Drawing Sheets

(51) Int. Cl.
*G06F 3/046* (2006.01)
*G06F 3/0484* (2022.01)

(56) References Cited

U.S. PATENT DOCUMENTS

| | | | |
|---|---|---|---|
| 8,681,103 | B2 | 3/2014 | Cha et al. |
| 10,811,201 | B1 | 10/2020 | Files et al. |
| 10,989,978 | B1 | 4/2021 | Tsen et al. |
| 11,023,016 | B2 | 6/2021 | Kim et al. |
| 11,119,621 | B2 | 9/2021 | Schenone et al. |
| 2010/0039764 | A1 | 2/2010 | Locker et al. |
| 2014/0333542 | A1 | 11/2014 | Barreca |
| 2016/0320810 | A1 | 11/2016 | Kim et al. |
| 2019/0341006 | A1 | 11/2019 | Mori et al. |
| 2020/0081584 | A1* | 3/2020 | Schenone ............. G06F 1/1647 |
| 2024/0069595 | A1 | 2/2024 | Hendren et al. |

FOREIGN PATENT DOCUMENTS

| | | | |
|---|---|---|---|
| KR | 10-2011-0004183 | A | 1/2011 |
| KR | 10-2016-0129665 | A | 11/2016 |
| KR | 10-2437603 | B1 | 8/2022 |

* cited by examiner

ELECTRONIC DEVICE AND METHOD FOR SENSING ATTACHMENT OF USER INPUT DEVICE

CROSS-REFERENCE TO RELATED APPLICATION(S)

This application is a continuation application, claiming priority under § 365 (c), of an International application No. PCT/KR2023/006870, filed on May 19, 2023, which is based on and claims the benefit of a Korean patent application number 10-2022-0088600, filed on Jul. 18, 2022, in the Korean Intellectual Property Office, and of a Korean patent application number 10-2022-0105102, filed on Aug. 22, 2022, in the Korean Intellectual Property Office, the disclosure of each of which is incorporated by reference herein in its entirety.

BACKGROUND

1. Field

The disclosure relates to an electronic device and a method for detecting an attachment of a user input device.

2. Description of Related Art

An electronic device including a display may be connected to a user input device, based on wireless communication technology. In addition, the user input device may be attached to the electronic device. The electronic device including the display may switch a configuration of a user interface (UI), in response to the attachment of the user input device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for detecting an attachment of a user input device.

Additional aspects will be set forth in part in the description which follows and, in part, will be apparent from the description, or may be learned by practice of the presented embodiments.

In accordance with an aspect of the disclosure, an electronic device is provided. The electronic device includes a display, memory storing one or more computer programs, and one or more processors communicatively coupled to the display and the memory, wherein the one or more computer programs include computer-executable instructions that, when executed by the one or more processors individually or collectively, cause the electronic device to display a user interface (UI) having a first size within a display region of the display, receive touch inputs contacted on the display region while the user interface is displayed, in response to the touch inputs, identify a first partial region of the display region, based on a pattern and/or a position of contact points corresponding to the touch input on the display region, wherein he first partial region of the display region is positioned under an external electronic device on the display region, and in response to the identification, refrain from recognizing a touch input having a contact point within the first partial region, and display the user interface having a second size smaller than the first size, within a second partial region of the display region adjacent to the first partial region.

In accordance with another aspect of the disclosure, a method performed by an electronic device is provided. The method includes displaying a user interface (UI) having a first size within a display region of the display, receiving touch inputs contacted on the display region while the user interface is displayed, in response to the touch inputs, identifying a first partial region of the display region, based on a pattern and/or a position of contact points of the touch input on the display region, wherein the first partial region of the display region is positioned under an external electronic device on the display region, in response to the identification, refraining from recognizing a touch input having a contact point within the first partial region, and displaying the user interface having a second size smaller than the first size, within a second partial region of the display region adjacent to the first partial region.

In accordance with another aspect of the disclosure, a user input device is provided. The user input device includes an input interface for receiving a user input, a transceiver for connecting with an electronic device, structures forming a designated pattern and/or designated positions, disposed on a surface of the user input device, outer structures disposed on a surface of the user input device, wherein the structures are disposed within a closed region formed by the outer structures on a surface of the user input device, and wherein each of the structures and the outer structures is configured with a material for providing a change in an electrical signal.

In accordance with another aspect of the disclosure, an apparatus is provided. The apparatus includes structures forming a designated pattern and/or designated positions, disposed on a surface of the plate, and outer structures disposed on a surface of the plate, wherein the structures are disposed within a closed region formed by the outer structures on a surface of the plate, and wherein each of the structures and the outer structures is configured with a material for providing a change in an electrical signal via contact.

In accordance with another aspect of the disclosure, one or more non-transitory computer-readable storage media storing computer-executable instructions that, when executed by a processor individually or collectively, cause an electronic device to perform operations are provided. The operations include displaying a user interface (UI) having a first size within a display region of the display, receiving touch inputs contacted on the display region while the user interface is displayed, in response to the touch inputs, identifying a first partial region of the display region, based on a pattern and/or a position of contact points corresponding to the touch input on the display region, wherein the first partial region of the display region is positioned under an external electronic device on the display region, in response to the identification, refraining from recognizing a touch input having a contact point within the first partial region, and displaying the user interface having a second size smaller than the first size, within a second partial region of the display region adjacent to the first partial region.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
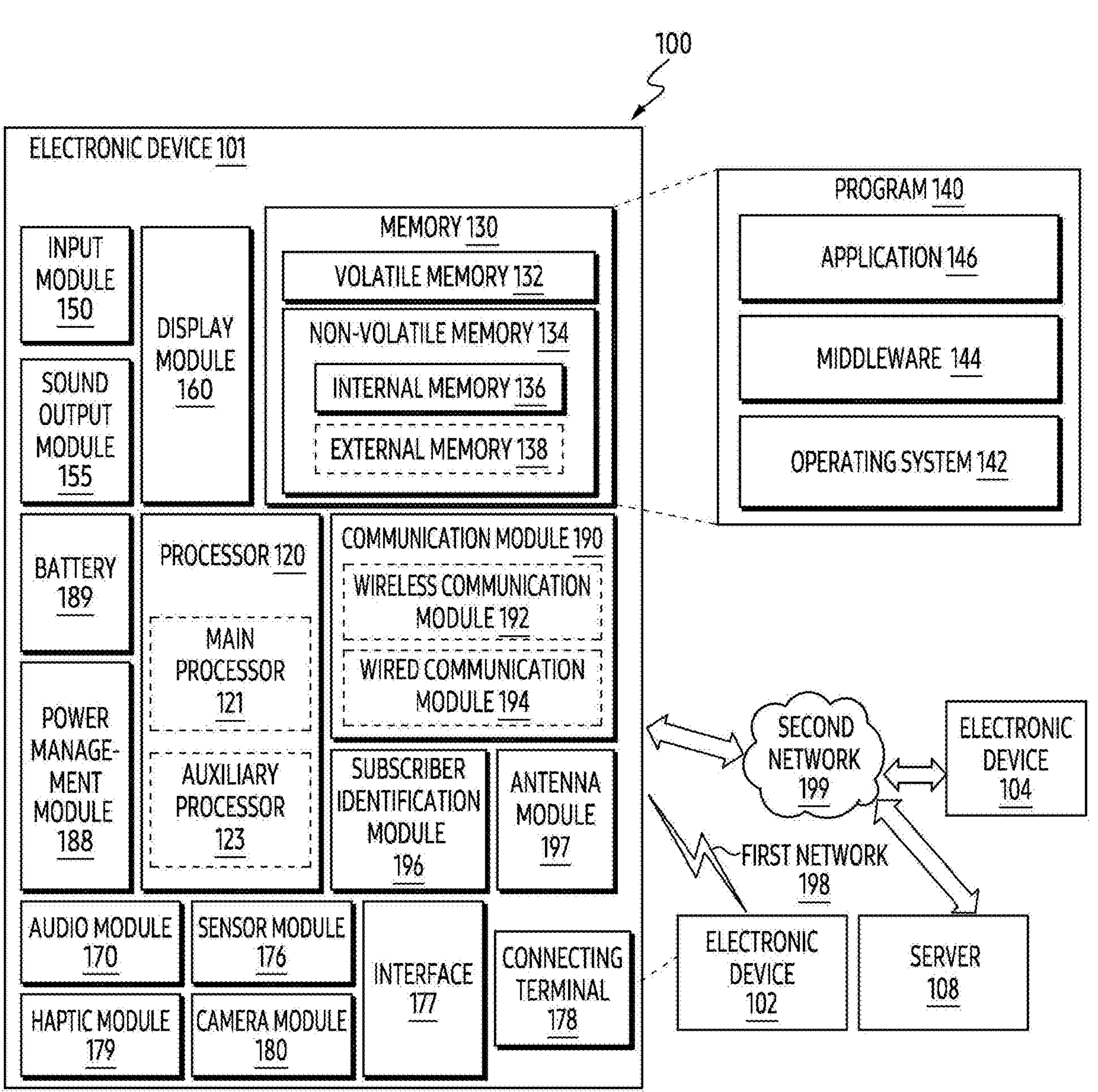
FIG. 1 is a block diagram of an electronic device in a network environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The term and words used in the following description and claims are not limited to the bibliographical meanings, but, are merely used by the inventor to enable a clear and consistent understanding of the disclosure. Accordingly, it should be apparent to those skilled in the art at the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, a hardware approach will be described as an example. However, since the various embodiments of the disclosure include technology that uses both hardware and software, the various embodiments of the disclosure do not exclude a software-based approach.

Terms referring to attachment (e.g., landing, mounting, equipped with, contacting, sticking), terms referring to structure (e.g., object, pad, sticker), terms referring to electronic magnetic resonance modules (EMR modules) (e.g., electromagnetic induction module (object image), S-PEN module), terms referring to patterns (e.g., design), and the like, used in the following description are exemplified for convenience of explanation. Therefore, the disclosure is not limited to terms to be described below, and another term having an equivalent technical meaning may be used. In addition, a term such as ' . . . part, ' . . . device', ' . . . material', and ' . . . structure', and the like used below may mean at least one shape structure or may mean a unit processing a function.

In addition, in the disclosure, the term 'greater than' or 'less than' may be used to determine whether a particular condition is satisfied or fulfilled, but this is only a description to express an example and does not exclude description of 'greater than or equal to' or 'less than or equal to'. A condition described as 'greater than or equal to' may be replaced with 'greater than', a condition described as 'less than or equal to' may be replaced with 'less than', and a condition described as 'greater than or equal to and less than' may be replaced with 'greater than and less than or equal to'. In addition, hereinafter, 'A' to 'B' refer to at least one of elements from A (including A) to B (including B). Hereinafter, 'C' and/or 'D' refer to including at least one of 'C' or 'D', that is, {'C', 'D', and 'C' and 'D'}.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
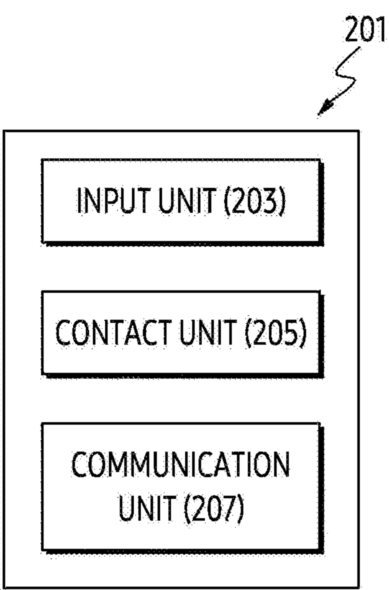
FIG. 2 illustrates an example of a functional configuration of a user input device according to an embodiment of the disclosure.

FIG. 2 illustrates a functional configuration of a user input device according to an embodiment of the disclosure.

Referring to FIG. 2, the configuration may be understood as a configuration of a user input device (e.g., the external electronic device 102) for identifying an attachment of a user input device (e.g., the external electronic device 102) to the electronic device 101, in a case that the user input device (e.g., the external electronic device 102) is attached to the electronic device 101 as mentioned in FIG. 1. Hereinafter, the terms ' . . . unit' and ' . . . device' used refer to a unit for processing at least one function or operation, which may be implemented by hardware, software, or a combination of hardware and software.

Referring to FIG. 2, a user input device 201 may include an input unit 203, a contact unit 205, and a communication unit 207. For example, the user input device 201 is an electronic device for receiving a user's input. For example, the user input device 201 may be a keyboard. For example, the user input device 201 may be a joy pad. For example, the user input device 201 may be a pen tablet.

The user input device 201 may include the input unit 203. The input unit 203 is a component of the user input device 201 for receiving a user input. For example, the input unit 203 may be a keypad on a keyboard. For example, the input unit 203 may be a joystick and a button on the joy pad. For example, the input unit 203 may be a panel on the pen tablet.

The user input device 201 may include the contact unit 205. The contact unit 205 is a component of the user input device 201 for identifying the attachment of the user input device 201 by an electronic device (e.g., the electronic device 101 of FIG. 1) different from the user input device 201. Through the contact unit 205, the electronic device 101 may identify whether the user input device 201 contacts the electronic device 101. According to an embodiment of the disclosure, the contact unit 205 may include one or more structures that provide capacitance for receiving a touch input of the electronic device 101. For example, the contact unit 205 may be disposed on a surface (e.g., rear surface) of the user input device 201. According to an embodiment of the disclosure, the contact unit 205 may include one or more electronic magnetic resonance (EMR) modules disposed on the rear surface of the user input device 201.

The user input device 201 may include a communication unit 207 (e.g., the communication module 190 of FIG. 1). The communication unit 207 is a component for communication connection with the electronic device 101. The user input device 201 may perform communication with the electronic device 101 through the communication unit 207. According to an embodiment of the disclosure, the user input device 201 may perform short-range wireless network communication. For example, the user input device 201 may perform Bluetooth communication with the electronic device 101 through the communication unit 207. The communication unit 207 may include a Bluetooth module. In addition, for example, the user input device 201 may perform wireless LAN communication. The communication unit 207 may include a Wi-Fi module.

Before describing embodiments of the disclosure, terms necessary to describe operations of an electronic device (e.g., the electronic device 101 of FIG. 1) according to embodiments are defined. A user input device (e.g., the user input device 201 of FIG. 2) refers to a separate device used to provide a user's input to the electronic device 101. A display region of a display refers to a portion of the display where a screen is displayed. The screen refers to an image, a user interface (UI), a video, and the like displayed in the display region of the display. A first partial region refers to a region of the display disposed underneath the user input device 201 attached to the electronic device 101. A second partial region refers to at least one region excluding the first partial region in the display region of the display, in a case that the user input device 201 is attached to the electronic device 101. A contact point (or point of contact) refers to a position on the display in which an object (e.g., a pen, a finger) providing a touch input on the display is in contact with the display. An outer contact point refers to a contact point formed close to an edge of the display region of the display. A touch input refers to an input caused by contact of an external object (e.g., a hand, an object forming capacitance, or an EMR module) on the display. The user input device 201 being attached to the electronic device 101 means that the user input device 201 electrically connected to the electronic device 101 is disposed above the display of the electronic device 101. A structure refers to an object attached to or included in an external electronic device (e.g., the user input device 201) for a touch input to the electronic device. An outer structure refers to a structure formed close to an edge of an external electronic device (e.g., the user input device 201).

Figure 3:
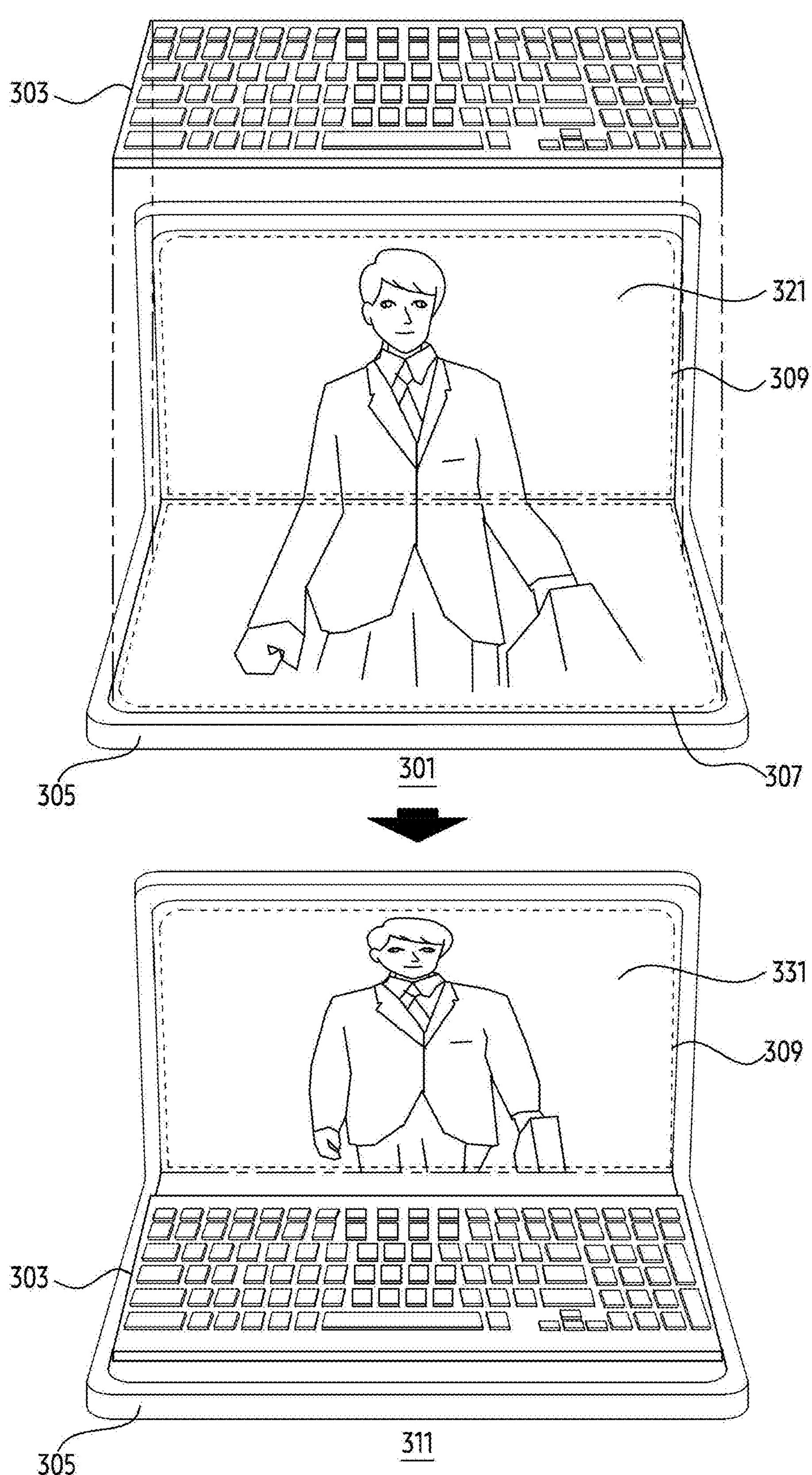
FIG. 3 illustrates an example of size conversion of a user interface according to an attachment of a user input device, according to an embodiment of the disclosure.

FIG. 3 illustrates an example of size conversion of a user interface according to an attachment of a user input device, according to an embodiment of the disclosure. The user input device may be attached to the electronic device 101. For example, the electronic device 101 may be a foldable device. The electronic device 101 may include a first housing, a second housing, and a hinge structure that provides an unfolded state in which a first surface of a first housing and a first surface of the second housing face the same direction or a folded state in which the first surface of the first housing and the first surface of the second housing face each other, by rotatably connecting the first housing and the second housing. A display of the electronic device 101 may include a flexible display.

Referring to FIG. 3, in a first state 301, a user input device 303 may not be attached to an electronic device 305. The user input device 303 exemplifies the user input device 201 of FIG. 2. The electronic device 305 exemplifies the electronic device 101 of FIG. 1. The first state 301 indicates a state before the user input device 303 is attached to the electronic device 305. A second state 311 indicates a state after the user input device 303 is attached to the electronic device 305. A state of the electronic device 305 may be changed from the first state 301 to the second state 311, based on the attachment of the user input device 303.

The electronic device 305 may include a display (e.g., the display module 160). Based on the user input device 303 being attached to the electronic device 305, the display of the electronic device 305 may be divided into a first partial region 307 and a second partial region 309. The display of the electronic device 305 may include the first partial region 307 and the second partial region 309. The first partial region 307 refers to a region of the display covered under the user input device 303 attached to the electronic device 305. The second partial region 309 refers to a region excluding the first partial region 307 in the display.

In the first state 301, the electronic device 305 may display a first screen 321 through the display. The first screen 321 may include a user interface having a first size. In a second state 311, the electronic device 305 may display a second screen 331 through the display. The second screen 331 may include a user interface having a second size. Due to the attachment of the user input device 303, the second size may be smaller than the first size. The size of the second screen 331 may be smaller than or equal to the size of the second partial region 309. According to an embodiment of the disclosure, at least one processor (e.g., the processor 120 of FIG. 1) of the electronic device 305 may control the display to output the second screen 331 from the first screen 321, based on identifying the attachment of the user input device 303. Since the first partial region 307 is not exposed to the outside, it is difficult for a user to visually identify the first partial region 307 covered by the user input device 303. Accordingly, the electronic device 305 may control to display the second screen 331 within the second partial region 309.

According to an embodiment of the disclosure, the electronic device 305 in the first state 301 may display the first screen 321 on a display region of the entire display. The display region of the display refers to a region in which a screen is displayed among portions of the display. The first size of the first screen 321 may be smaller than or equal to the sum of the size of the first partial region 307 and the size of the second partial region 309. The electronic device 305 in the second state 311 may display the second screen 331 on the second partial region of the display. The second size of the second screen 331 may be smaller than or equal to the size of the second partial region. The first screen 321 may be switched to the second screen 331, in response to the attachment of the user input device. For example, the at least one processor 120 may control the display to output the second screen 331, by reducing the first screen 321 to a fixed ratio. In addition, for example, the at least one processor 120 may control the display so that the first screen 321 is rotated by 90 degrees to the left or right and reduced to become the second screen 331. In addition, for example, the at least one processor 120 may control the display to output only a portion of the first screen 321 corresponding to the size of the second screen 331, by excluding a portion of the first screen 321.

According to an embodiment of the disclosure, when displaying the second screen 331, the at least one processor 120 may control the display to reduce the first screen 321 based on the importance of each region within the first screen 321. For example, when displaying the second screen 331, the at least one processor 120 may not control the display to simply reduce the first screen 321 according to a fixed ratio. For example, the at least one processor 120 may display a user interface of an office program of the first screen 321. The at least one processor 120 may reduce a lower portion of the first screen 321 but maintain an upper portion including a menu of the office program. In addition, according to an embodiment of the disclosure, the at least one processor 120 may vary a background reduction ratio and a character reduction ratio when displaying the second screen 331. This is because visibility of characters may decrease according to a size of the characters.

As described above, in a case that the user input device 303 is disposed above a region of the electronic device 305, a change in a size of the screen of the interface is required. In a case that the user input device 303 is disposed above a region of the electronic device 305, the electronic device 305 may require to detect the attachment of the user input device 303, in order to change the size of the screen of the interface. Hereinafter, in FIG. 4, a scheme in which the electronic device 305 identifies an attachment of the user input device 303 will be described.

Figure 4:
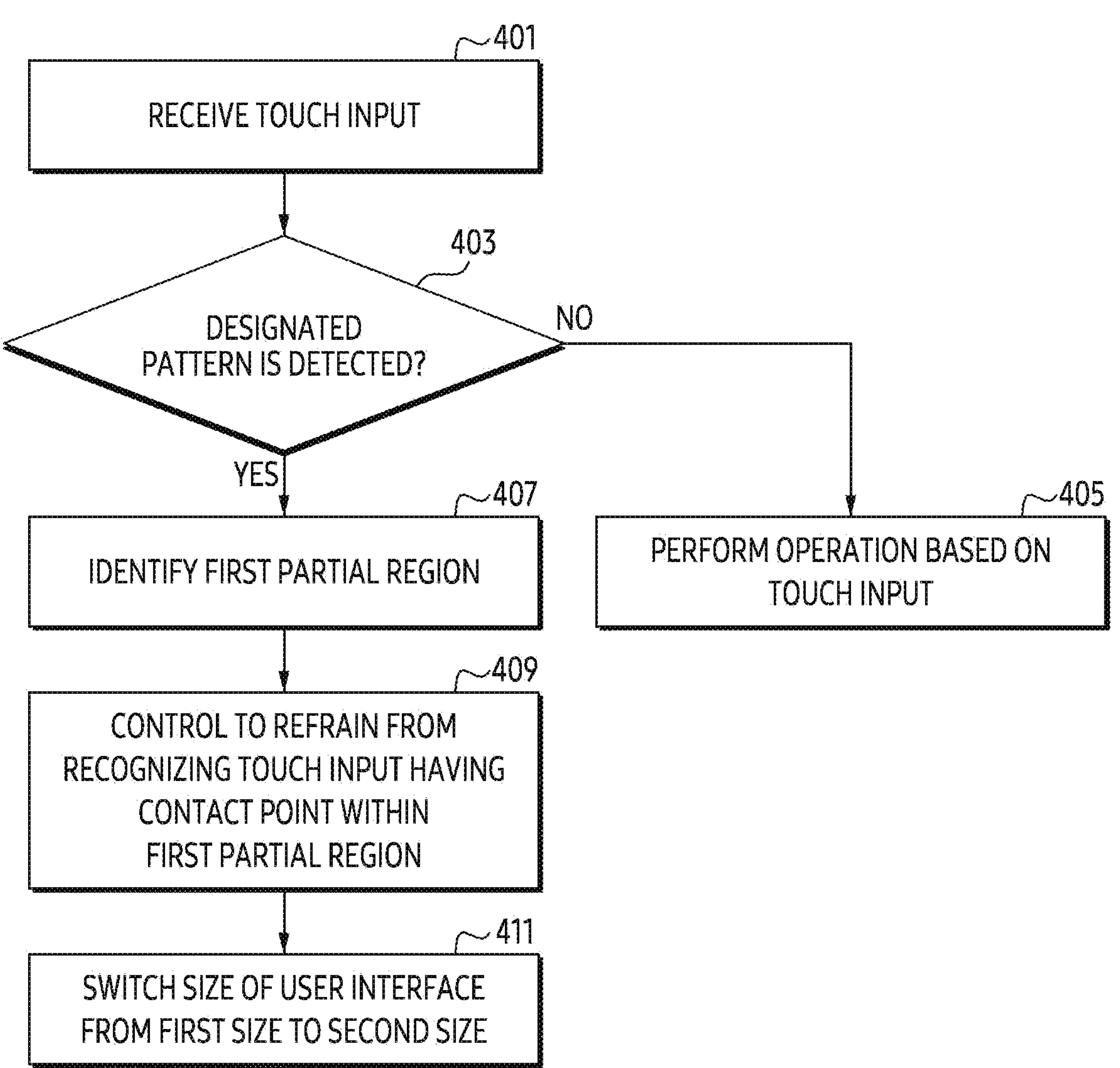
FIG. 4 illustrates an operation flow of an electronic device for detecting an attachment of a user input device, according to an embodiment of the disclosure.

FIG. 4 illustrates an operation flow of an electronic device (e.g., the electronic device 101 of FIG. 1, the electronic device 305 of FIG. 3, hereinafter, referred to as the electronic device 101) for detecting an attachment of a user input device according to an embodiment of the disclosure. At least one processor (e.g., the processor 120 of FIG. 1) of the electronic device 101 may perform an operation for changing a size of a screen and reducing a malfunction, based on identifying the attachment of the user input device.

Referring to FIG. 4, in operation 401, at least one processor 120 may receive a touch input. As an external object is in contact with a touch panel of the display of the electronic device 101, the at least one processor 120 may receive the touch input. According to an embodiment of the disclosure, the touch input may be caused by one or more structures disposed on a surface of a user input device (e.g., the user input device 201 of FIG. 2 and the user input device 303 of FIG. 3). The one or more structures may be in contact with the surface of the electronic device 101 to provide capacitance for changing an electrical signal. For example, the one or more structures may include a material providing static electricity. In addition, according to an embodiment of the disclosure, the touch input may be caused by one or more EMR modules disposed on a surface of the user input device 201. As each of the one or more structures or the one or more EMR modules is contacted to the display of the electronic device, the touch input received in operation 401 may provide an electronic input. One or more contact points may be formed on the display. Each electromagnetic input may correspond to a touch input.

In order to receive the touch input, the at least one processor 120 may identify whether a condition for receiving the touch input is satisfied. According to an embodiment of the disclosure, the electronic device 101 may be a foldable device. The electronic device 101 may include a first housing, a second housing, and a hinge structure that provides an unfolded state in which a first surface of a first housing and a first surface of the second housing face the same direction or a folded state in which the first surface of the first housing and the first surface of the second housing face each other, by rotatably connecting the first housing and the second housing.

The at least one processor 120 may identify whether a condition for receiving the touch input is satisfied, based on an angle formed by the first housing and the second housing of the electronic device 101. For example, in a case that the angle formed by the first housing and the second housing is greater than or equal to a threshold value (e.g., 30 degrees), the electronic device 101 may recognize that a user environment for the user input device 201 is equipped. The electronic device 101 may be a personal computer (PC). The at least one processor 120 may identify that the condition is satisfied, in a case that an angle formed by the first housing and the second housing is greater than or equal to a threshold value (e.g., 30 degrees). According to an embodiment of the disclosure, the at least one processor 120 may receive the touch input, based on identifying that the condition is satisfied. Meanwhile, according to an embodiment of the disclosure, the at least one processor 120 may receive the touch input without considering the condition.

In operation 403, the at least one processor 120 may identify whether a designated pattern is detected. The designated pattern may mean the arrangement of one or more structures physically formed in the user input device 201, or one or more EMR modules. In operation 401, the at least one processor 120 may identify positions of contact points, according to each of the one or more structures or the one or more EMR modules. The at least one processor 120 may identify whether a combination of the positions on the display corresponds to the designated pattern. The at least one processor 120 may identify that the designated pattern is detected, based on identifying that the combination of positions corresponds to the designated pattern. In a case that the designated pattern is detected, the at least one processor 120 may identify the attachment of the user input device 201.

The at least one processor 120 may perform operation 407, in a case that the designated pattern is detected. The at least one processor 120 may perform operation 405 in a case that the designated pattern is not detected.

In operation 405, the at least one processor 120 may perform an operation based on a touch input. If the designated pattern is not detected, the at least one processor 120 may identify that the touch input received in operation 401 is received for selection of a region of the electronic device 101 rather than the attachment of the user input device 201. For example, the electronic device 101 may recognize that the touch input received in operation 401 is a touch input for performing a task. The electronic device 101 may perform a task based on the at least one touch input. For example, the electronic device 101 may perform a function of extending the display region of the display, corresponding to a plurality of touch inputs different from the designated pattern. For example, the electronic device 101 may perform a function of reducing the display region of the display, corresponding to a plurality of touch inputs different from the designated pattern. For example, the electronic device 101 may perform a function of switching a screen on the display, corresponding to the at least one touch input.

In operation 407, the at least one processor 120 may identify a first partial region. The at least one processor 120 may identify the first partial region, based on identifying a pattern and/or position of the one or more contact points. If a designated pattern is detected, the at least one processor 120 may identify that a combination of touch inputs received in operation 401 indicates the user input device 201. The at least one processor 120 may identify the first partial region to provide a user screen according to the arrangement of the user input device 201.

In operation 409, the at least one processor 120 may control to refrain from recognizing a touch input having a contact point within the first partial region. In order to reduce malfunction, the at least one processor 120 may not identify a touch input in the first partial region as an input for a task. The malfunction may be that the at least one processor 120 performs a task different from the user's intention. When the user input device is attached to the electronic device, the user's intention may be not to use an input function of the first partial region. A touch input having a contact point in the first partial region may be used for detecting the attachment of the user input device instead of an input function for a task.

The at least one processor 120 may control to refrain from recognizing a touch input having a contact point in the first partial region. For example, an operation of refraining from recognizing the touch input may mean an operation of deactivating a panel (e.g., a touch panel) for identifying a touch input in the first partial region. For example, the operation of refraining from recognizing the touch input may mean an operation of not obtaining feedback on the touch input. For example, the operation of refraining from recognizing the touch input may mean an operation of not generating feedback on the touch input. For example, the operation of refraining from recognizing the touch input may mean an operation of not providing feedback on the touch input. For example, the operation of refraining from recognizing the touch input may mean an operation of ignoring the touch input in the first partial region. For example, it may mean an operation of ignoring an additional touch input in the first partial region, based on identifying a pattern and/or position of the one or more contact points.

In operation 411, the at least one processor 120 may switch a size of the user interface from a first size to a second size. The electronic device 101 may display a user interface having the first size in the display region of the display, before attaching the user input device 201. After the user input device 201 is attached to the electronic device 101, the electronic device 101 may change the size of the user interface for user convenience. The first size may be smaller than or equal to a size of the display region of the display. The second size may be smaller than or equal to a size of a second partial region. The second partial region may be a portion excluding the first partial region from the display region. Due to invisibility of the first partial region to which the user input device 201 is attached, the at least one processor 120 may display a user interface within the second partial region.

Although not illustrated in FIG. 4, the at least one processor 120 may additionally perform an operation for power efficiency. According to an embodiment of the disclosure, the at least one processor 120 may control the display to lower screen brightness of the first partial region, in response to identification of the first partial region. According to an embodiment of the disclosure, the at least one processor may control the display to turn off a screen of the first partial region, in response to the identification of the first partial region.

In FIG. 4, a user input device 201 (e.g., external keyboard) attached to the electronic device 101 is illustrated, but embodiments of the disclosure are not limited thereto. The operations of FIG. 4 may also be applied even if an external device (e.g., a substrate or a film) different from the user input device is attached to the electronic device 101.

Figure 5:
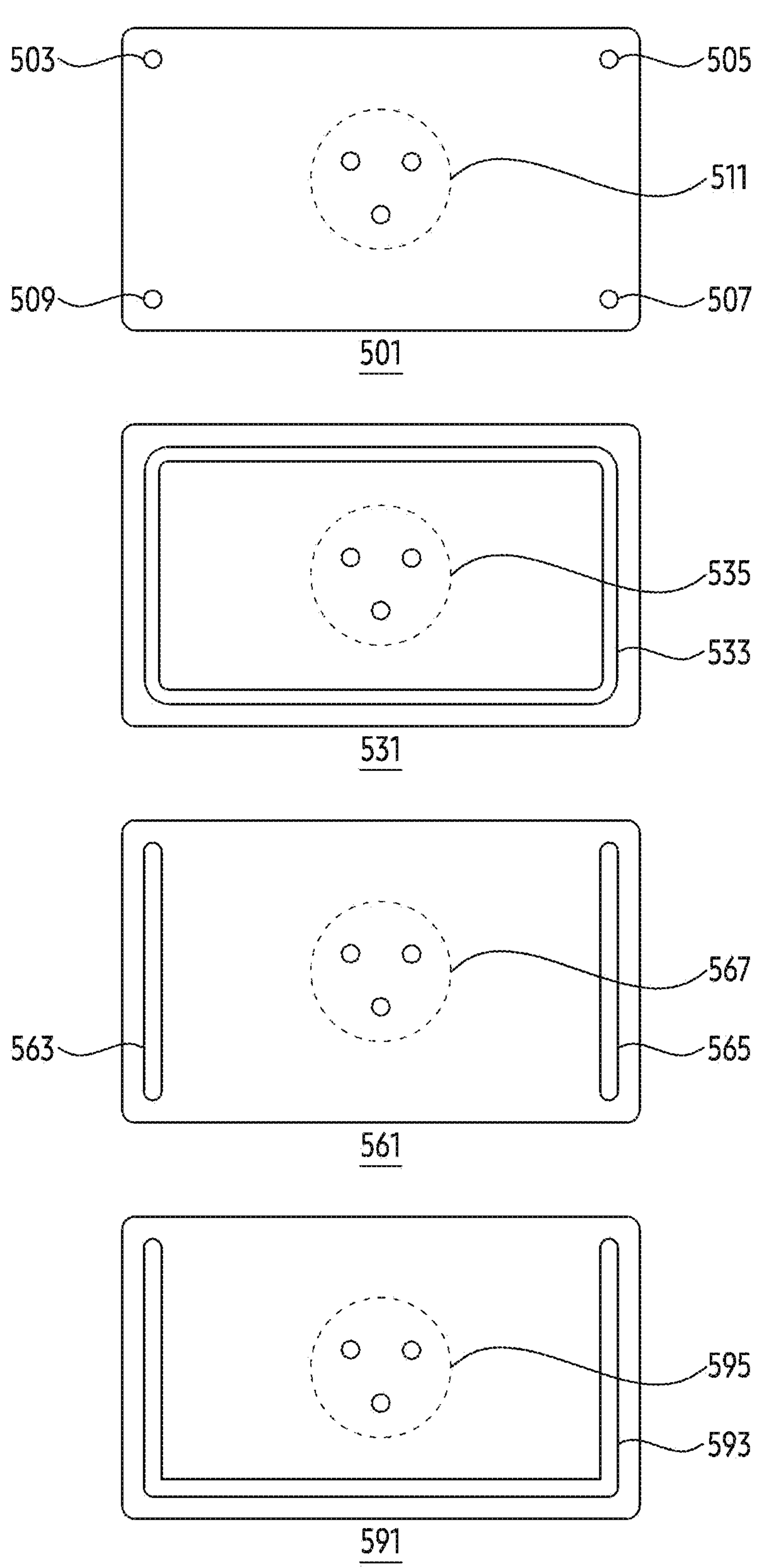
FIG. 5 illustrates examples in which at least one outer structure is disposed on a surface of a user input device, according to an embodiment of the disclosure.

FIG. 5 illustrates examples in which at least one outer structure is disposed on a surface of a user input device (e.g., the user input device 201 of FIG. 2 and the user input device 303 of FIG. 3), according to an embodiment of the disclosure. An electronic device (e.g., the electronic device 101 of FIG. 1, the electronic devices 101 and 305 of FIG. 3) may identify an attachment of the user input device 201 through a pattern of at least one touch input according to the at least one structure. The electronic device 101 may identify a first partial region through a region of the at least one touch input caused by the at least one outer structure. The electronic device 101 may perform an operation for reducing a malfunction and a screen change operation for user convenience, based on the identified first partial region.

Referring to FIG. 5, a surface 501 of the user input device 201 may include one or more structures 511 and one or more outer structures. The one or more outer structures may include a first outer structure 503, a second outer structure 505, a third outer structure 507, and a fourth outer structure 509. Four outer structures are illustrated in FIG. 5, but embodiments of the disclosure are not limited thereto. More than four outer structures or less than four outer structures may be disposed on the surface 501 of the user input device 201.

The one or more outer structures may be used to indicate the first partial region on the display. The one or more structures 511 may display an attachment of the user input device 201. According to an embodiment of the disclosure, each of the one or more structures 511 and the outer structures 503, 505, 507, and 509 may be configured with a material for providing a capacitive input. As an electrical signal changes through contact on the display, the electronic device 101 may detect touch inputs by the one or more structures 511 and the outer structures 503, 505, 507, and 509 through the display. In addition, according to an embodiment of the disclosure, each of the one or more structures 511 and the outer structures 503, 505, 507, and 509 may include an EMR module.

The electronic device 101 may detect the attachment of the external electronic device 101, based on identifying that the arrangement of the one or more structures 511 is a designated pattern. Thereafter, the electronic device 101 may identify the first partial region based on identifying the outer structures 503, 505, 507, and 509. The first partial region may be a closed region identified by the outer structures 503, 505, 507, and 509. The closed region may be determined based on contact points corresponding to the outer structures 503, 505, 507, 509 within the display region of the display. The first partial region may be an inner region of a figure formed by the outer structures 503, 505, 507, and 509.

Although the outer structures 503, 505, 507, and 509 form a quadrilateral on the surface 501, embodiments of the disclosure are not limited thereto. For example, the outer structures of the user input device 201 may form a polygon (e.g., a triangle). For example, the outer structures of the user input device 201 may form a quadrilateral, pentagon, circle, or ellipse. For example, the outer structures of the user input device 201 may form an arbitrary figure in which each of outer structures corresponds to a vertex.

A surface 531 of the user input device 201 may include one or more structures 535 and one or more outer structures. The one or more outer structures may include an outer structure 533 forming a closed figure. A region inside the outer structure 533 may correspond to the first partial region on the display.

The one or more structures 535 may be used to detect the attachment of the user input device 201. According to an embodiment of the disclosure, each of the one or more structures 535 and the outer structure 533 may be configured with a material for providing a capacitive input. As an electrical signal changes through contact on the display, the electronic device 101 may detect touch inputs by the one or more structures 535 and the outer structures 533 through the display. In addition, according to an embodiment of the disclosure, each of the one or more structures 535 and the outer structure 533 may be an EMR module.

The electronic device 101 may detect the attachment of the user input device 201 based on identifying that the arrangement of the one or more structures 535 is a designated pattern. Thereafter, the electronic device 101 may identify the first partial region based on identifying the outer structure 533. The first partial region may be a closed region of the outer structure 533. Alternatively, the first partial region may be an inner region of a closed region formed by the outer structure 533. Although it is described that the outer structure 533 forms a quadrilateral in the surface 531, embodiments of the disclosure are not limited thereto. For example, the outer structure of the user input device 201 may form a polygon (e.g., a triangle). For example, the outer structure of the user input device 201 may form a quadrilateral, pentagon, circle, or ellipse.

A surface 561 of the user input device 201 may include one or more structures 567 and one or more outer structures. The one or more outer structures may include a first outer structure 563 and a second outer structure 565. Outer structures 563 and 565 may be used to indicate a first partial region on the display. The one or more structures 567 may indicate the attachment of the user input device 201. According to an embodiment of the disclosure, each of the one or more structures 567 and the outer structures 563 and 565 may be configured with a material for providing a capacitive input. As an electrical signal changes through contact on the display, the electronic device 101 may detect touch inputs by the one or more structures 567 and the outer structures 563 and 565 through the display. In addition, according to an embodiment of the disclosure, each of the one or more structures 567 and the outer structures 563 and 565 may be an EMR module.

The electronic device 101 may detect the attachment of the external electronic device 101, based on identifying that the arrangement of the one or more structures 567 is a designated pattern. Thereafter, the electronic device 101 may identify the first partial region based on identifying the outer structures 563 and 565. The first partial region may be a closed region identified by the outer structures 563 and 565. The closed region may be determined based on contact points corresponding to the outer structures 503, 505, 507, and 509 within the display region of the display. The first partial region may be an inner region of a figure formed by the outer structures 563 and 565. For example, the first partial region may be an inner region of a figure formed by connecting close end points of the outer structure 563 and the outer structure 565. For example, outer structures 563 and 565 may be a set of discontinuous outer structures that form a part of corner of the figure.

Although it is illustrated that the outer structures 563 and 565 form facing corners of quadrilateral on the surface 561, embodiments of the disclosure are not limited thereto. For example, the outer structures of the user input device 201 may be formed in a curved shape. For example, an arbitrary figure connecting close end points of the outer structure 563 and the outer structure 565 of the user input device 201 may be formed.

A surface 591 of the user input device 201 may include one or more structures 595 and one or more outer structures. The one or more outer structures may include an outer structure 593. The outer structure 593 may be used to display a first partial region on the display.

The one or more structures 595 may be used to detect an attachment of the user input device 201. According to an embodiment of the disclosure, each of the one or more structures 595 and the outer structure 593 may be configured with a material for providing a capacitive input. As an electrical signal changes through contact on the display, the electronic device 101 may detect touch inputs by the one or more structures 595 and the outer structures 593 through the display. In addition, according to an embodiment of the disclosure, each of the one or more structures 595 and the outer structure 593 may be an EMR module.

The electronic device 101 may detect the attachment of the user input device 201 based on identifying that the arrangement of the one or more structures 595 is a designated pattern. Thereafter, the electronic device 101 may identify the first partial region based on identifying the outer structure 593. The first partial region may be a closed region formed by the outer structure 593. Although it is illustrated that the outer structure 593 forms a portion of quadrilateral on the surface 591, embodiments of the disclosure are not limited thereto. For example, the outer structure 593 may form a part of a corner of a polygon (e.g., a triangle). For example, the outer structure 593 may form a part of a circle and a part of an ellipse. For example, the outer structure 593 may form a part of an arbitrary figure connecting both end points of the outer structure 593.

In a surface of the user input device 201 described in FIG. 5, palm rejection may occur in a case that an area in which a structure is in contact with the display is greater than or equal to a designated width. The palm rejection means that the at least one electronic device 101 refrains from identifying a touch input in a case that a touch input greater than or equal to a designated area is identified. Therefore, an area in which each structure is in contact with the display is required to be smaller than a threshold value for determining palm rejection. Therefore, a contact region of each structure of the user input device 201 may have an area smaller than the threshold value for determining the palm rejection. For example, a contact region of the user input device 201 may be configured with points or lines.

The order between an operation of identifying a structure of the electronic device 101 and an operation of identifying an outer structure when the user input device 201 is attached to the electronic device 101 is not predetermined. According to an embodiment of the disclosure, in a case that the user input device 201 is attached to the electronic device 101, the electronic device 101 may identify a structure before an outer structure. According to an embodiment of the disclosure, in a case that the user input device 201 is attached to the electronic device 101, the electronic device 101 may identify the outer structure before the structure.

Figure 6A:
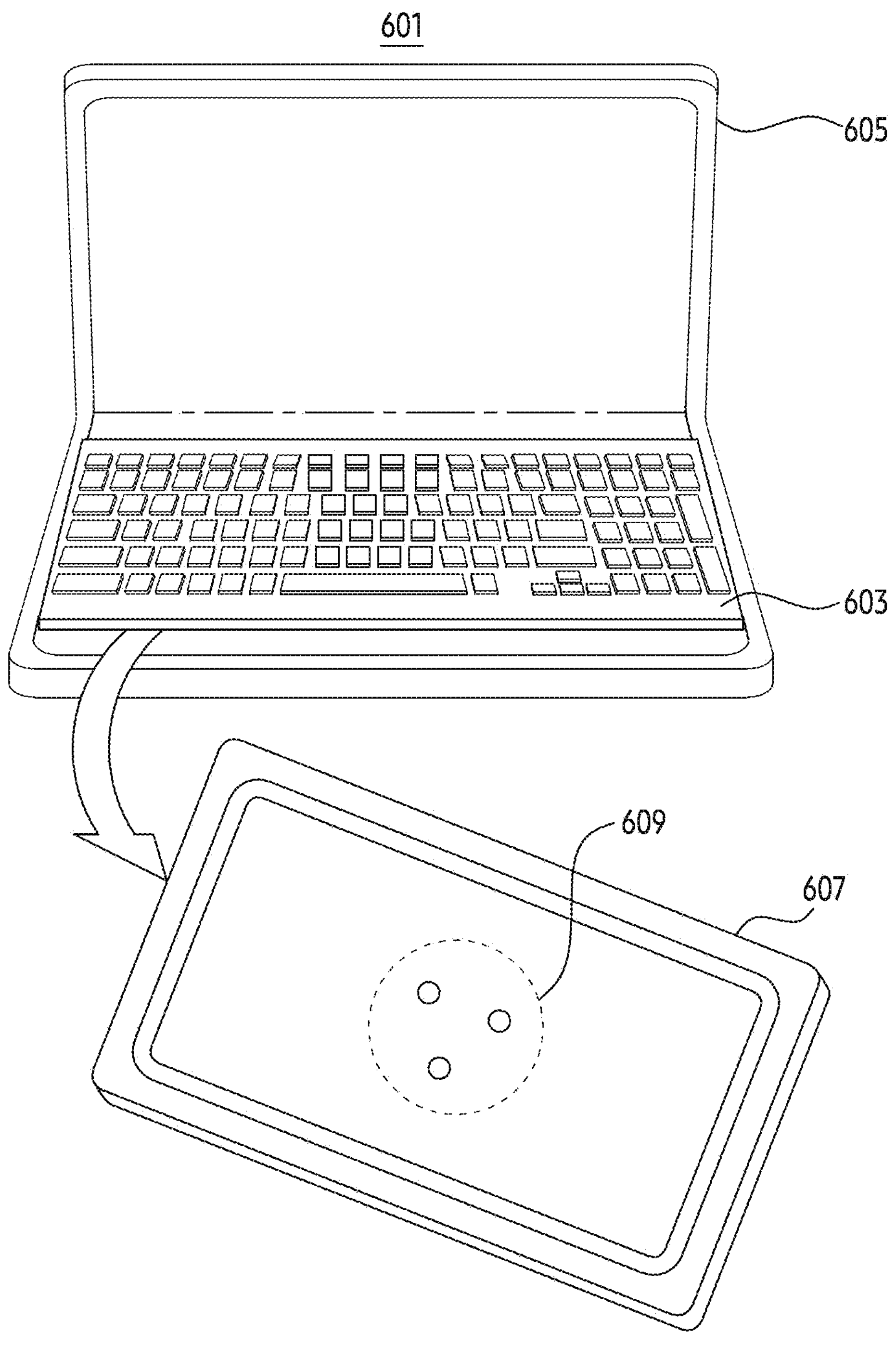
FIG. 6A illustrates an example of a type of a user input device corresponding to a pattern of at least one structure, according to an embodiment of the disclosure.
Figure 6B:
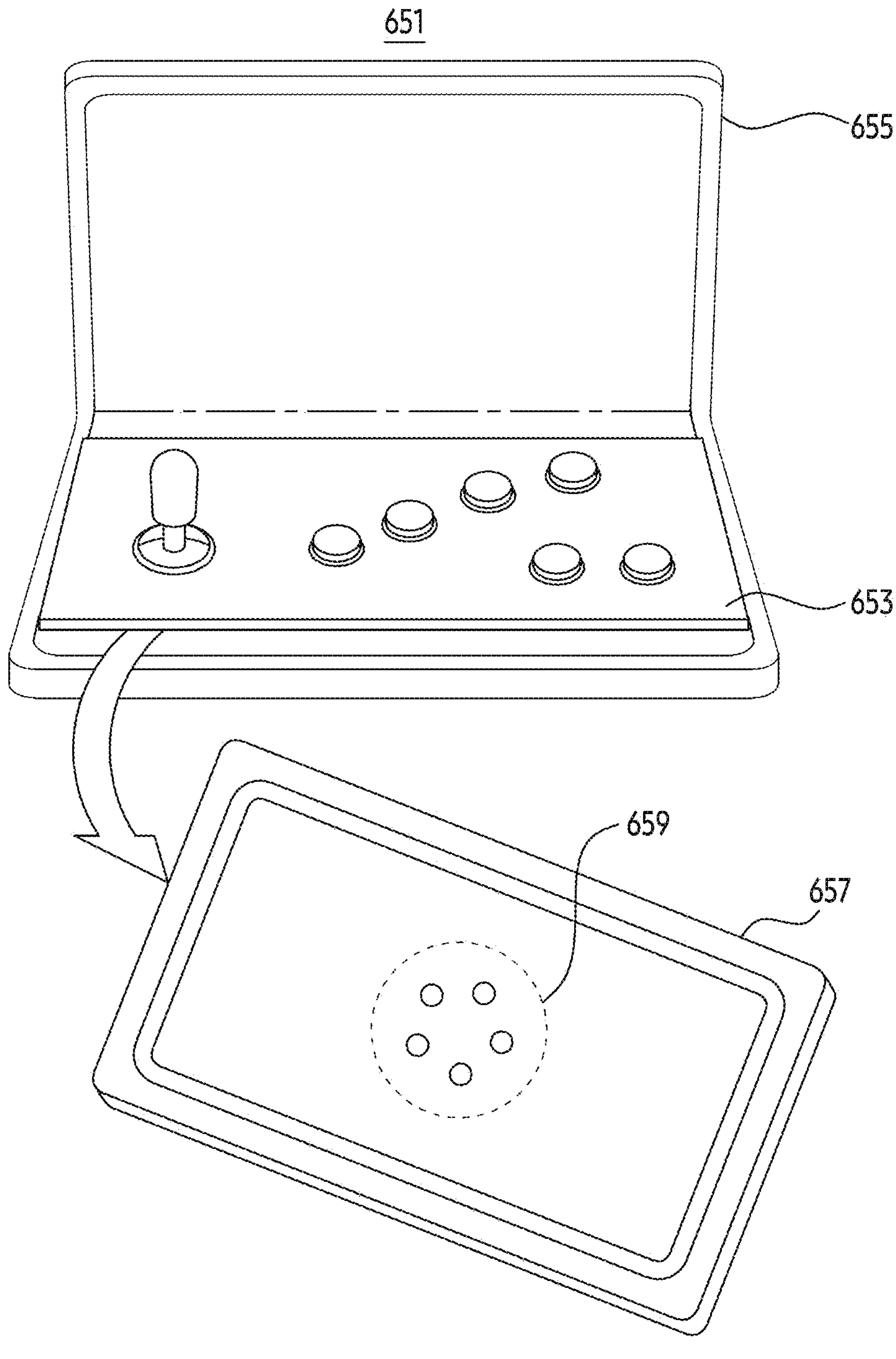
FIG. 6B illustrates an example of a type of a user input device corresponding to a pattern of at least one structure, according to an embodiment of the disclosure.
Figure 6C:
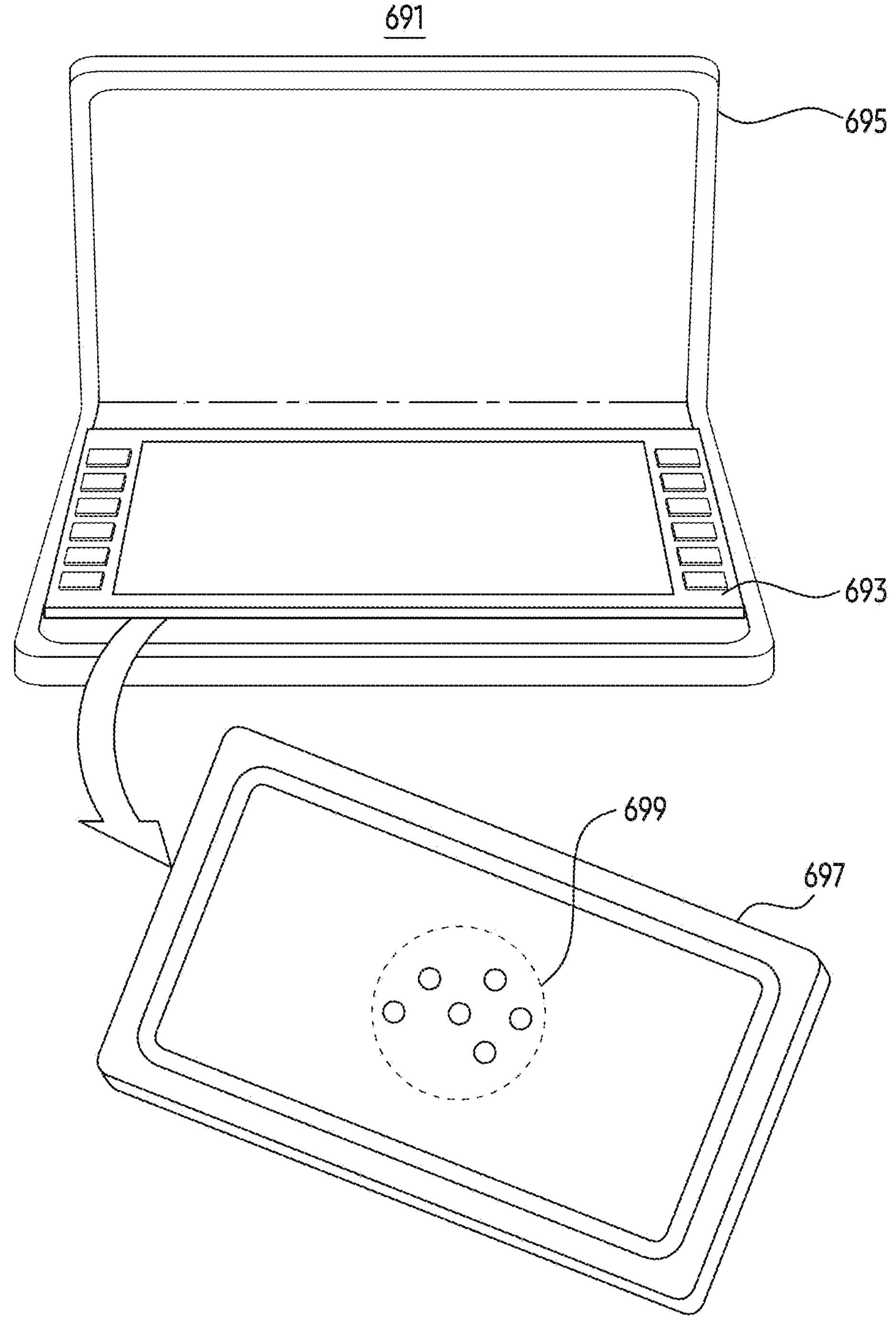
FIG. 6C illustrates an example of a type of a user input device corresponding to a pattern of at least one structure, according to an embodiment of the disclosure.

FIGS. 6A, 6B, and 6C illustrate examples of a type of a user input device corresponding to a pattern of at least one structure, according to various embodiments of the disclosure. An electronic device (e.g., the electronic device 101 of FIG. 1, the electronic device 305 of FIG. 3) may identify a type of a user input device based on a pattern of at least one contact point. The at least one contact point may correspond to a position at which a touch input by a structure and an outer structure of an external electronic device occurs. Accordingly, a pattern of the at least one contact point is determined according to a pattern of the at least one structure. According to an embodiment of the disclosure, the at least one structure may be configured with a material that forms capacitance for providing an electrical signal for a touch input to the electronic device. According to an embodiment of the disclosure, the at least one structure may be an EMR module.

Referring to FIG. 6A, a matching 601 of a pattern and a keyboard 603 indicates a pattern corresponding to the keyboard. The keyboard 603 may be attached to an electronic device 605. Structures may be disposed on a surface 607 of the keyboard 603. The structures may form a pattern 609. For example, the keyboard 603 may correspond to a triangular pattern. For example, the keyboard 603 may correspond to a polygonal pattern. The pattern 609 may be designated to indicate the keyboard 603. Based on identifying the pattern 609, the electronic device 605 may identify that a type of the user input device is the keyboard 603.

Referring to FIG. 6B, a matching 651 between a pattern and a joy pad 653 indicates a pattern corresponding to the joy pad. The joy pad 653 may be attached to an electronic device 655. Structures may be disposed on a surface 657 of the joy pad 653. The structures may form a pattern 659. For example, the joy pad 653 may correspond to a pentagonal pattern. For example, the joy pad 653 may correspond to a circular pattern. The pattern 659 may be designated to indicate the joy pad 653. Based on identifying the pattern 659, the electronic device 655 may identify that a type of the user input device is the joy pad 653.

Referring to FIG. 6C, a matching 691 between a pattern and a pen tablet 693 indicates a pattern 699 corresponding to the pen tablet 693. The pen tablet 693 may be attached to an electronic device 695. Structures may be disposed on a surface 697 of the pen tablet 693. The structures may form a pattern 699. For example, the pen tablet 693 may correspond to a heptagonal pattern. For example, the pen tablet 693 may correspond to a heart-shaped pattern. The pattern 699 may be designated to indicate to the pen tablet 693. Based on identifying the pattern 699, the electronic device 695 may identify that a type of the user input device is the pen tablet 693.

Although FIGS. 6A, 6B, and 6C describe a pattern of structures in a form of figures, the embodiments of the disclosure are not limited thereto. According to embodiments of the disclosure, the pattern of structures may be based on the number of structures. For example, if there are three structures, the user input device may be a keyboard. For example, if there are five structures, the user input device may be a joy pad. For example, if there are seven structures, the user input device may be a pen tablet.

Although FIGS. 6A, 6B, and 6C illustrate that the user input device corresponds only to the pattern of structures, the embodiments of the disclosure are not limited thereto. According to embodiments of the disclosure, identification of a type of the user input device may be based on the position of the structures. For example, if the structures are positioned only on the left, the user input device may be a keyboard. For example, if the structures are positioned only on the center, the user input device may be a joy pad. For example, if the structures are positioned only on the right, the user input device may be a pen tablet.

Figure 7:
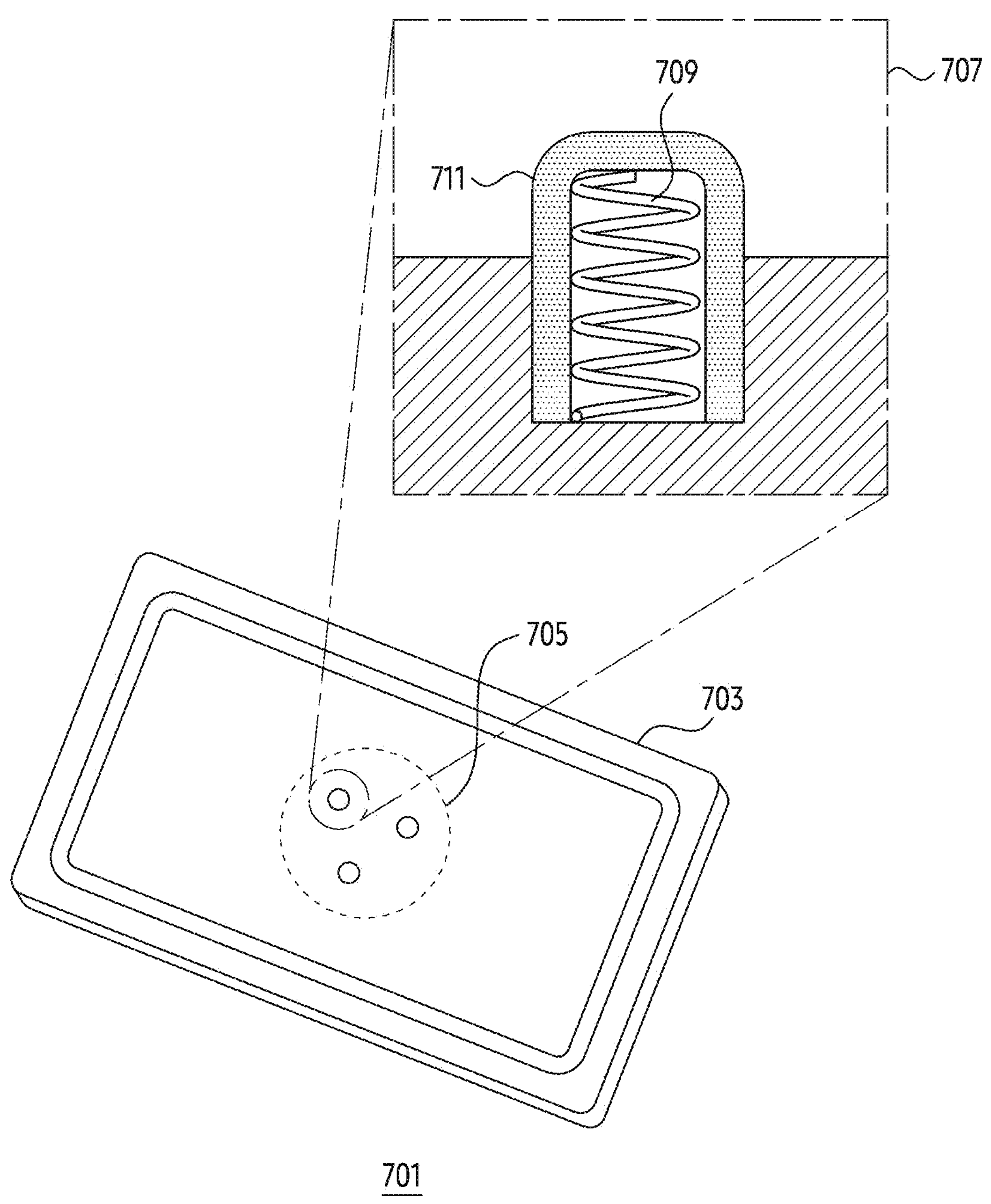
FIG. 7 illustrates an example of a user input device including an electromagnetic induction module, according to an embodiment of the disclosure.

FIG. 7 illustrates an example of a user input device (e.g., the user input device 201 of FIG. 2, the user input device 303 of FIG. 3) including an electromagnetic induction module, according to an embodiment of the disclosure. The electromagnetic induction module (hereinafter, EMR module) may cause a touch input when being in contact with an electronic device. Hereinafter, a structure including the EMR module will be described.

Referring to FIG. 7, a configuration 701 of a surface (e.g., rear surface) of the user input device 201 may be a structure of a rear surface of a user input device. An outer structure 703 may be disposed to identify a first partial region 705. The outer structure 703 may be configured with a material forming capacitance. According to an embodiment of the disclosure, a structure of the rear surface of the user input device 201 may be an EMR module.

A cross section 707 of the user input device 201 may be a cross section of an EMR module 711 coupled to the user input device 201. The EMR module 711 may be fixedly disposed in the user input device. A coil 709 may be a component of the EMR module 711. When the EMR module 711 is in contact with the electronic device 101, a deformation of the coil 709 may be generated. Electromagnetic induction may be generated by the deformation of the coil 709. With this principle, the EMR module 711 may cause a touch input.

The EMR module 711 may be coupled to the user input device 201, so that a partial region of the EMR module 711 protrudes from a surface of the user input device 201. In a case that the user input device 201 is attached to the electronic device 101, the protruding partial region of the EMR module 711 may be in contact with the electronic device 101. Electromagnetic induction is generated by the contact between the electronic device 101 and the protruding partial region. The EMR module 711 may cause a touch input to the electronic device 101 through an electromagnetic induction panel of a contacted display. The EMR module 711 may cause a touch input to the electronic device 101 through electromagnetic induction.

Figure 8:
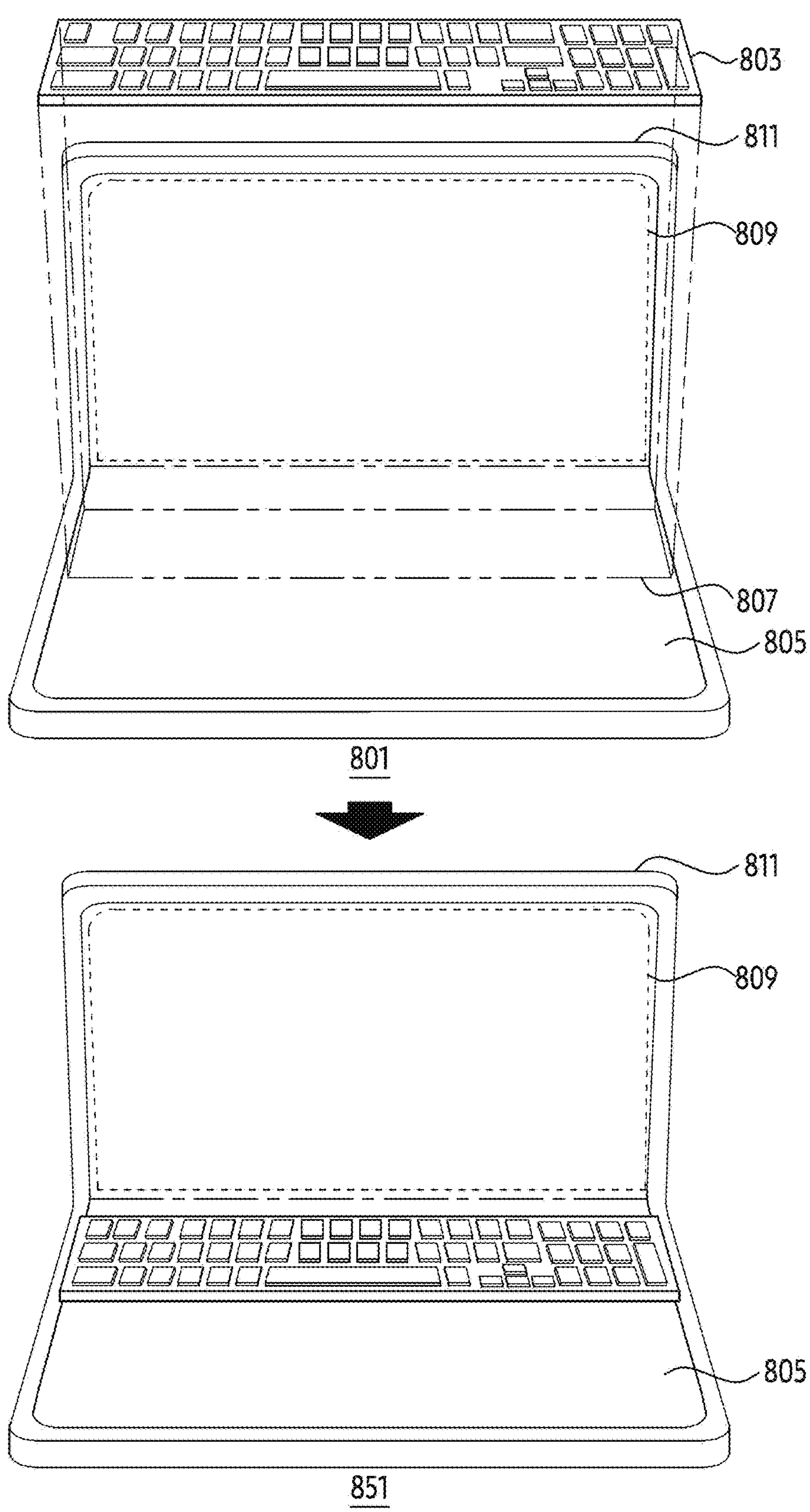
FIG. 8 illustrates an example of a user input device smaller than a surface of an electronic device, according to an embodiment of the disclosure.

FIG. 8 illustrates an example of a user input device smaller than a surface of an electronic device, according to an embodiment of the disclosure. The user input device may be attached to an electronic device 101. For example, the electronic device 101 may be a foldable device. The electronic device 101 may include a first housing, a second housing, and a hinge structure that provides an unfolded state in which a first surface of a first housing and a first surface of the second housing face the same direction or a folded state in which the first surface of the first housing and the first surface of the second housing face each other, by rotatably connecting the first housing and the second housing. A display of the electronic device 101 may include a flexible display.

Referring to FIG. 8, in a first state 801, a user input device 803 may not be attached to an electronic device 811. The user input device 803 exemplifies the user input device 201 of FIG. 2. The electronic device 811 exemplifies the electronic device 101 of FIG. 1. Due to a difference between a region of the first housing, a region of the second housing, and a region of a surface of the user input device 803, a region of a display of the electronic device 101 may be divided into a first partial region, a second partial region, and a third partial region by the user input device 201.

The first state 801 may be before the user input device 803 smaller than a surface of the electronic device 811 is attached to the electronic device 811. A second state 851 may be a state after the user input device 803 smaller than the surface of the electronic device 811 is attached to the electronic device 811. The user input device 803 may be an external electronic device, attached to the electronic device 811 and dividing the electronic device 811 into at least three or more portions. A first partial region 805 may be a portion of a display region of the display disposed underneath the user input device 803 when the user input device 803 is attached to the electronic device 811. A second partial region 807 may be a portion excluding the first partial region 805 from the display region when the user input device 803 is attached to the electronic device 811. A third partial region 809 may be a portion spaced apart from the second partial region 807, among portions excluding the first partial region 805 from the display region when the user input device 803 is attached to the electronic device 811. For example, the third partial region 809 may be a portion in which the display region of a surface of the electronic device 811 to which the user input device 803 is attached excludes the first partial region 805. According to embodiments of the disclosure, the at least one processor (e.g., the processor 120 of FIG. 1) may control a display of the third partial region 809 for power efficiency or user convenience, when the user input device 803 is attached to the electronic device 811. The at least one processor 120 may control the display of the third partial region 809 for power efficiency when the user input device 803 is attached to the electronic device 811. The at least one processor 120 may control the display of the third partial region 809 for user convenience when the user input device 803 is attached to the electronic device 811. Hereinafter, in FIG. 9, a display control scheme of the third partial region of the at least one processor is described.

Figure 9:
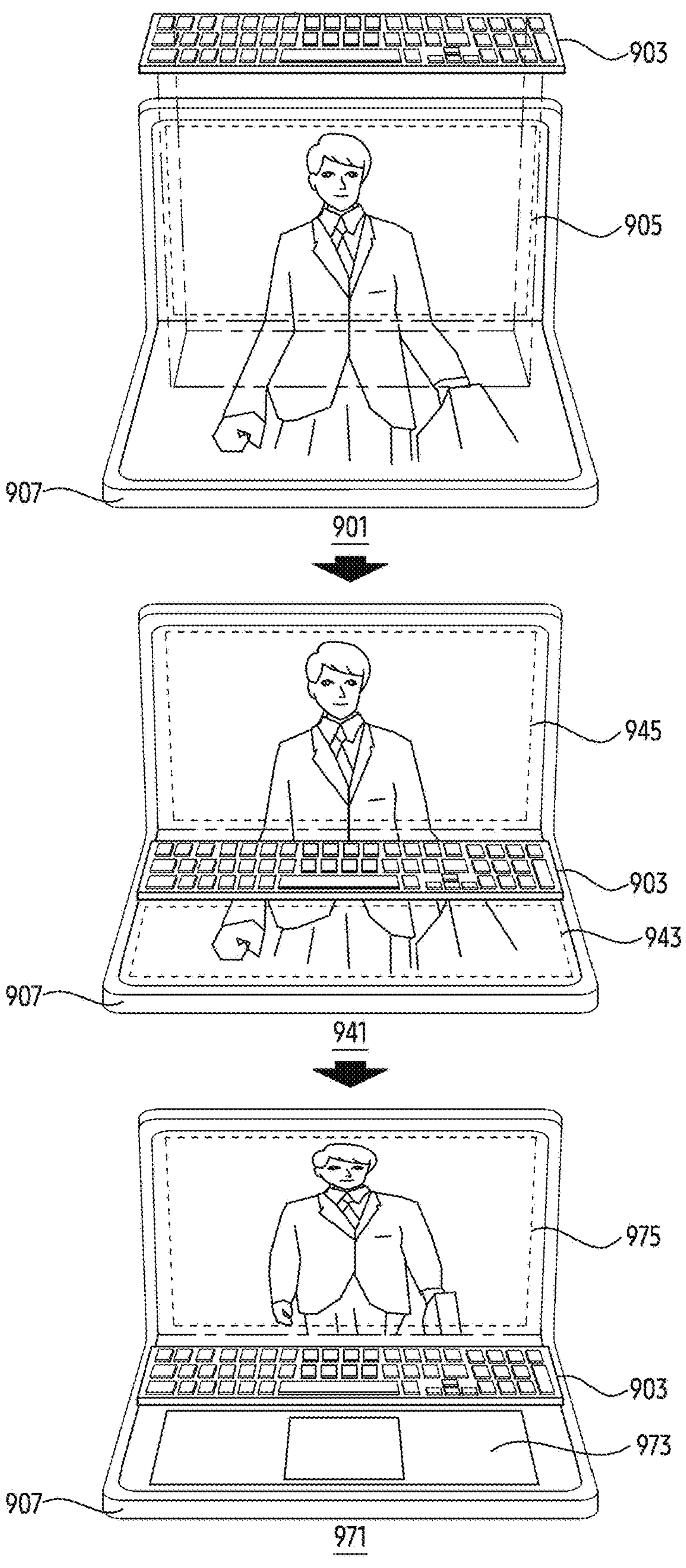
FIG. 9 illustrates an example of switching a user interface when a user input device smaller than a surface of an electronic device is attached, according to an embodiment of the disclosure.

FIG. 9 illustrates an example of switching a user interface when a user input device smaller than a surface of an electronic device is attached, according to an embodiment of the disclosure. The user input device may be attached to an electronic device 101. For example, the electronic device 101 may be a foldable device. The electronic device 101 may include a first housing, a second housing, and a hinge structure that provides an unfolded state in which a first surface of a first housing and a first surface of the second housing face the same direction or a folded state in which the first surface of the first housing and the first surface of the second housing face each other, by rotatably connecting the first housing and the second housing. A display of the electronic device 101 may include a flexible display.

Referring to FIG. 9, in a first state 901, a user input device 903 may not be attached to an electronic device 907. The user input device 903 exemplifies the user input device 201 of FIG. 2. The electronic device 907 exemplifies the electronic device 101 of FIG. 1. In the first state 901, the user input device 903 may be prior to being attached to a surface of the electronic device 907. The user input device 903 may be an external electronic device for a user input. An area of the user input device 903 may be smaller than a surface of the electronic device. The electronic device 907 may include a display. A first screen 905 may be displayed in the entire display region of the display of the electronic device. For example, in the first state 901, the at least one processor may display the first screen 905 throughout the entire display region of the display.

In a second state 941, the user input device 903 may be after being attached to a surface of the electronic device 907. A second screen 945 may be displayed in a second partial region. A third screen 943 may be displayed in a third partial region. According to the user interface, the second screen 945 of the second partial region and the third screen 943 of the third partial region may be maintained the same as before the user input device is attached.

In a third state 971, the user input device 903 may be after being attached to a surface of the electronic device 907. A fourth screen 975 may be displayed in the second partial region. A fifth screen 973 may be displayed in the third partial region. After the user input device is attached, the first screen 905 may be reduced to the fourth screen 975. A user interface for user convenience may be displayed on the fifth screen 973. According to an embodiment of the disclosure, the fifth screen 973 may display a user interface for receiving a touch input. For example, the fifth screen 973 may include at least one slider receiving a drag input. For example, the fifth screen 973 may include at least one switch for selecting an option. According to an embodiment of the disclosure, the fifth screen 973 may display a user interface for displaying information. For example, the fifth screen 973 may include at least one navigation bar.

Although not illustrated in FIG. 9, the at least one processor according to embodiments may control the fifth screen 973 for power efficiency when the user interface is switched. According to an embodiment of the disclosure, the at least one processor may control the display to lower brightness of the fifth screen 973. According to an embodiment of the disclosure, the at least one processor may control the display to turn off the fifth screen 973.

Although not shown in FIG. 9, the at least one processor may control a screen of the first partial region underneath the user input device 903 for power efficiency. For example, the at least one processor may control the display to lower screen brightness of the first partial region, in response to identification of the first partial region. For example, the at least one processor may control the display to turn off the screen of the first partial region, in response to the identification of the first partial region.

Figure 10:
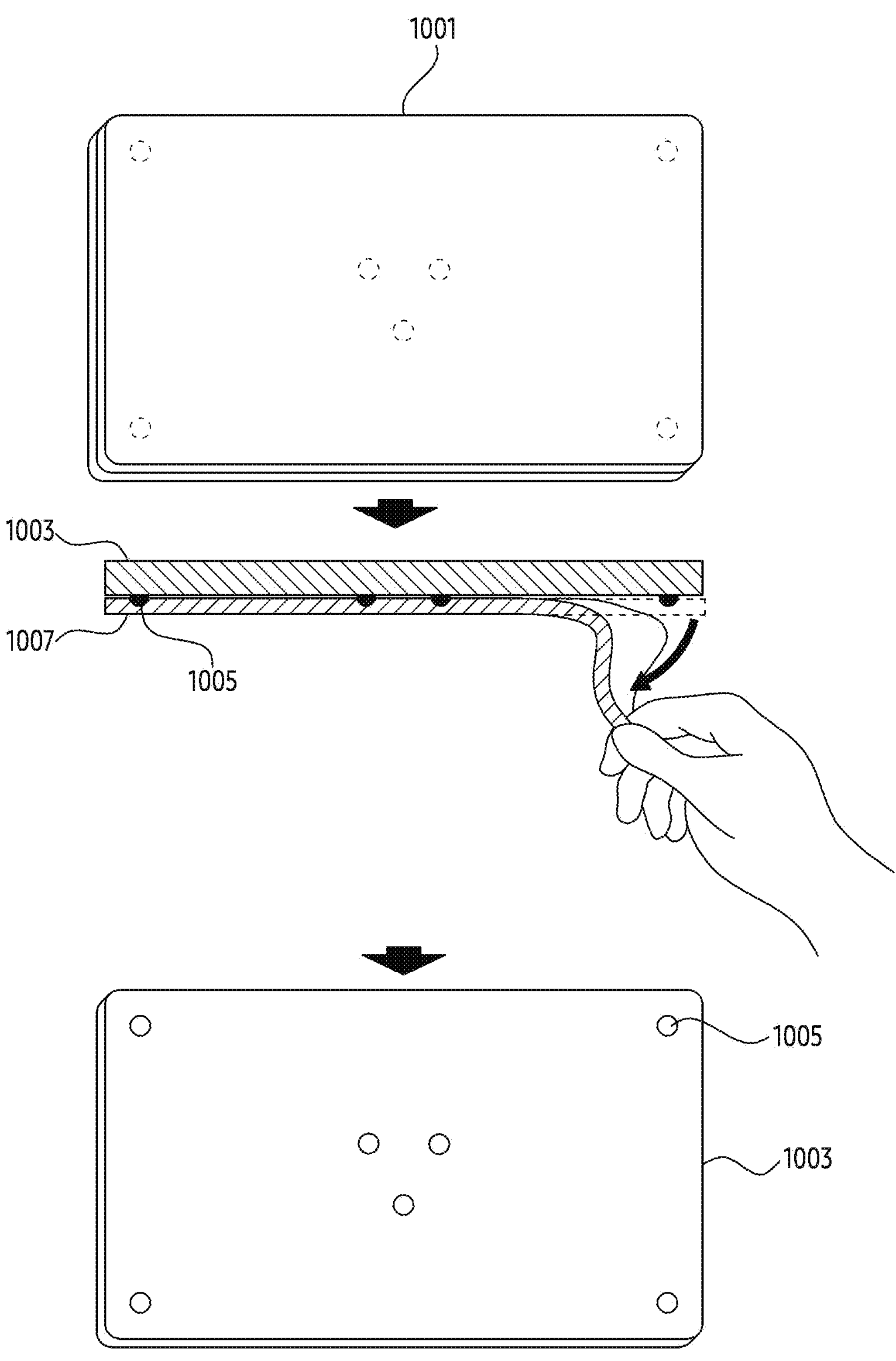
FIG. 10 illustrates an example of at least one structure attached to a surface of a user input device, according to an embodiment of the disclosure.

FIG. 10 illustrates an example of at least one structure attached to a surface of a user input device, according to an embodiment of the disclosure.

Referring to FIG. 10, an embodiment in which a separate apparatus is attached to a surface of a user input device, instead of the described structures and outer structures being formed above a surface of the user input device is described. The structures and the outer structures may be disposed on a surface of the user input device by the apparatus.

Referring to FIG. 10, a user input device 1001 may be a rear surface of the user input device. The user input device 1001 exemplifies the user input device 201 of FIG. 2. An apparatus 1003 may be an object for arranging at least one structure in the user input device 1001. For example, the apparatus 1003 may include a plastic film. For example, the apparatus 1003 may include a coated paper. One or more structures 1005 may cause a touch input to a display of the electronic device 101. The one or more structures 1005 may be configured with a material forming capacitance providing an electrical signal.

The apparatus 1003 may include a protective surface 1007, which is a contact surface of the one or more structures 1005. The contact surface covered by the protective surface 1007 may be a surface in which the electronic device 101 and a structure contact after the structure is attached to the user input device 1001. A surface of the apparatus 1003, opposite to a surface on which the protective surface 1007 is disposed, may be coupled with a surface of the user input device 1001. The apparatus 1003 and the user input device 1001 may be coupled so that the structure 1005 forms a designated pattern on a rear surface of the user input device. The user may remove the protective surface 1007 and attach a surface of the apparatus 1003 to the rear surface of the user input device 1001.

According to embodiments of the disclosure, a user may attach structures of a designated pattern to an arbitrary user input device through the apparatus. For example, even if the EMR module is not included in the rear surface of the user input device, the electronic device may identify an attachment of the user input device through the apparatus according to embodiments. For example, even if a structure configured with a material forming capacitance is not included on the rear surface of the user input device, the electronic device may identify the attachment of the user input device through the apparatus according to the embodiments.

A structure capable of being attached to an external device may be used for various operations. The at least one processor may perform a specific operation based on identifying a pattern of a specific structure. For example, the at least one processor may generate an image of a smiling face when a specific pattern is identified by a structure. For example, the at least one processor may generate an image including a phrase 'well done' when a specific pattern is identified by the structure. The at least one processor may obtain a result of an algorithm by identifying movement of a plurality of structures. For example, the electronic device may identify the user's victory or defeat by identifying movement of a plurality of structures attached under chess horses. The at least one processor may display a visual object according to victory or defeat on the display.

An electronic device according to embodiments of the disclosure may identify an attachment of an external electronic device (e.g., a user input device) by using existing panels (e.g., a touch screen panel (TSP), an electromagnetic induction panel (digitizer)) rather than a magnetic detection sensor (e.g., a hall sensor). Embodiments of the disclosure may be confirmed through the electronic device identifying the attachment of the external electronic device even though a magnet is not attached to a rear surface of the external electronic device. Embodiments of the disclosure may be confirmed through switching the user interface after identifying the attachment of the external electronic device. In embodiments of the disclosure, a magnetic detection sensor for attachment identification in an edge of the display may not be required. Therefore, various embodiments of the disclosure may implement a narrow bezel. In embodiments of the disclosure, a magnetic detection sensor inside the display may not be required. Therefore, when a touch input according to the EMR module, a position of the touch input may not be distorted by the magnetic detection sensor.

As described above, according to embodiments of the disclosure, an electronic device may comprise a display and a processor. The processor may be configured to display a user interface (UI) having a first size within a display region of the display. The processor may be configured to receive touch inputs contacted on the display region while the user interface is displayed. The processor may be configured to, in response to the touch inputs, identify a first partial region of the display region, based on a pattern and/or a position of contact points of the touch input on the display region. The first partial region of the display region may be positioned under (or underneath) an external electronic device on the display region. The processor may be configured to, in response to the identification, refrain from recognizing a touch input having a contact point within the first partial region. The processor may be configured to display the user interface having a second size smaller than the first size, within a second partial region of the display region adjacent to the first part region.

According to an embodiment of the disclosure, the first partial region may be identified based on outer contact points. The outer contact points may be formed closer to an edge of the display region of the display than the contact points.

According to an embodiment of the disclosure, the display may include an electromagnetic induction panel. The touch inputs may be received through the electromagnetic induction panel.

According to an embodiment of the disclosure, the processor may be further configured to, in response to the identification, display a determined user interface within a third partial region of the display region adjacent to the first partial region and spaced apart from the second partial region.

According to an embodiment of the disclosure, the processor may be further configured to, in response to the identification, lower screen brightness of the first partial region. The processor may be further configured to turn off a screen of the first partial region.

According to an embodiment of the disclosure, the processor may be further configured to identify a type corresponding to the pattern and/or the position of the contact points of the touch inputs, among a plurality of designated types for a user input device. The plurality of designated types may include a joy pad 653, a keyboard 603, and a pen tablet 693.

According to an embodiment of the disclosure, the electronic device may comprise a first housing and a second housing. The display may be a flexible display. The touch inputs may be received based on an angle formed by the first housing and the second housing.

According to an embodiment of the disclosure, the touch inputs may be received based on an external electronic device. The external electronic device may be connected to the electronic device by communication.

According to an embodiment of the disclosure, the processor may be configured to, in order to refrain from recognizing the touch input, deactivate a panel for identifying a touch input in the first partial region. The processor may be configured to not obtain feedback for the touch input. The processor may be configured to not generate feedback for the touch input. The processor may be configured to not provide feedback for the touch input.

As described above, according to embodiments of the disclosure, a method performed by an electronic device may comprise displaying a user interface (UI) having a first size within a display region of the display. The method may comprise receiving touch inputs contacted on the display region while the user interface is displayed. The method may comprise, in response to the touch inputs, identifying a first partial region of the display region, based on a pattern and/or a position of contact points of the touch input on the display region. The first partial region of the display region may be positioned under (or underneath) an external electronic device on the display region. The method may comprise, in response to the identification, refraining from recognizing a touch input having a contact point within the first partial region. The method may comprise displaying the user interface having a second size smaller than the first size, within a second partial region of the display region adjacent to the first part region.

According to an embodiment of the disclosure, the first partial region may be identified based on outer contact points. The outer contact points may be formed closer to an edge of the display region of a display than the contact points.

According to an embodiment of the disclosure, the display may include an electromagnetic induction panel. The touch inputs may be received through the electromagnetic induction panel.

According to an embodiment of the disclosure, the method may further comprise, in response to the identification, displaying a determined user interface within a third partial region of the display region adjacent to the first partial region and spaced apart from the second partial region.

According to an embodiment of the disclosure, the method may comprise, in response to the identification, lowering screen brightness of the first partial region, or turning off a screen of the first partial region.

According to an embodiment of the disclosure, the method may comprise identifying a type corresponding to the pattern and/or the position of the contact points of the touch inputs, among a plurality of designated types for a user input device. The plurality of designated types may include a joy pad 653, a keyboard 603, and a pen tablet 693.

According to an embodiment of the disclosure, the display may be a flexible display. The touch inputs may be received based on an angle formed by the first housing and the second housing.

According to an embodiment of the disclosure, the touch inputs may be received based on an external electronic device. The external electronic device may be connected to the electronic device by communication.

According to an embodiment of the disclosure, the refraining from recognizing the touch input may comprise deactivating a panel for identifying a touch input in the first partial region. The refraining from recognizing the touch input may comprise not obtaining, generating, or providing feedback for the touch input.

As described above, according to embodiments of the disclosure, a user input device may comprise an input interface for receiving a user input. The user input device may comprise a transceiver for connecting with an electronic device and structures forming a designated pattern and/or designated positions, disposed on a surface of the user input device. The user input device may comprise outer structures disposed on a surface of the user input device. The structures may be disposed within a closed region formed by the outer structures on a surface of the user input device. Each of the structures and the outer structures may be configured with a material for providing a change in an electrical signal.

According to an embodiment of the disclosure, each of the structures and the outer structures may comprise an EMR module.

As described above, according to embodiments of the disclosure, an apparatus 1003 in a form of a plate may comprise structures forming a designated pattern and/or designated positions, disposed on a surface of the plate. The apparatus 1003 may comprise outer structures disposed on a surface of the plate. The structures may be disposed within a closed region formed by the outer structures on a surface of the plate. Each of the structures and the outer structures may be configured with a material for providing a change in an electrical signal via contact.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as “A or B,” “at least one of A and B,” “at least one of A or B,” “A, B, or C,” “at least one of A, B, and C,” and “at least one of A, B, or C,” may include any one of or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” or “connected with” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
communication circuitry;
a display including a touch sensor;
memory, comprising one or more storage media, storing one or more instructions; and
at least one processor comprising processing circuitry,
wherein the instructions, when executed by the at least one processor individually or collectively, cause the electronic device to:
obtain, via the touch sensor, touch data,
based on the touch data being obtained while an external input device is connected via the communication circuitry to the electronic device, compare an arrangement of contact points indicated by the touch data with a predetermined arrangement indicated by predetermined touch data registered with respect to the external input device,
based on the arrangement of the contact points being identified as corresponding to the predetermined arrangement, identify a position of the external input device on the display in accordance with the touch data and size of the external input device registered with respect to the external input device,
determine a first portion of a display area of the display covered by the external input device in accordance with the position and the size,
display, in a second portion of the display area different from the first portion of the display area, a screen, and
refrain from displaying, in the first portion of the display area, a screen.

2. The electronic device of claim 1, wherein the instructions, when executed by the at least one processor individually or collectively, cause the electronic device to:
based on the arrangement of the contact points being identified as corresponding to the predetermined arrangement, determine the first portion of the display area in accordance with positions of the contact points indicated by the touch data.

3. The electronic device of claim 1,
wherein the first portion of the display area is positioned between the second portion of the display area and a third portion of the display area, and
wherein the instructions, when executed by the at least one processor individually or collectively, cause the electronic device to:
display, in the second portion of the display area and the third portion of the display area, the screen.

4. The electronic device of claim 1,
wherein the touch data indicates a number of the contact points, and
wherein the instructions, when executed by the at least one processor individually or collectively, cause the electronic device to:
based on the touch data being obtained while the external input device is connected via the communication circuitry to the electronic device, compare the number of the contact points indicated by the touch data with a predetermined number indicated by the predetermined touch data, and
based on the number of the contact points being identified as corresponding to the predetermined number, identify the position and the size.

5. The electronic device of claim 1, wherein the instructions, when executed by the at least one processor individually or collectively, cause the electronic device to:
determine the first portion of the display area of the display, and
receive, via the second portion of the display area from among the first portion of the display area and the second portion of the display area, a touch input.

6. The electronic device of claim 1, wherein the instructions, when executed by the at least one processor individually or collectively, cause the electronic device to:
based on the arrangement of the contact points being identified as different from the predetermined arrangement, refrain from determining the first portion of the display area, and
display, in the first portion of the display area and the second portion of the display area, the screen.

7. The electronic device of claim 1, wherein the instructions, when executed by the at least one processor individually or collectively, cause the electronic device to:
connect, via the communication circuitry, to the external input device,
receive, using the communication circuitry, from the external input device, a signal including data regarding an input, and
based on receiving the signal, perform a function corresponding to the input.

8. The electronic device of claim 1, wherein the instructions, when executed by the at least one processor individually or collectively, cause the electronic device to:
based on the first portion of the display area being determined while the screen is displayed in the first portion of the display area and the second portion of the display area, display, in the second portion of the display area from among the first portion of the display area and the second portion of the display area, the screen by changing a size of the screen from a first size to a second size smaller than the first size.

9. A method executed in an electronic device comprising communication circuitry and a display including a touch sensor, the method comprising:
obtaining, via the touch sensor, touch data;
based on the touch data being obtained while an external input device is connected via the communication circuitry to the electronic device, comparing an arrangement of contact points indicated by the touch data with a predetermined arrangement indicated by predetermined touch data registered with respect to the external input device;
based on the arrangement of the contact points being identified as corresponding to the predetermined arrangement, identifying a position of the external input device on the display in accordance with the touch data and size of the external input device registered with respect to the external input device;
determining a first portion of a display area of the display covered by the external input device in accordance with the position and the size;
displaying, in a second portion of the display area different from the first portion of the display area, a screen; and refraining from displaying, in the first portion of the display area, a screen.

10. The method of claim 9, further comprising:

based on the arrangement of the contact points being identified as corresponding to the predetermined arrangement, determining the first portion of the display area in accordance with positions of the contact points indicated by the touch data.

11. The method of claim 9, wherein the first portion of the display area is positioned between the second portion of the display area and a third portion of the display area, and wherein the method further comprises:

displaying, in the second portion of the display area and the third portion of the display area, the screen.

12. The method of claim 9, wherein the touch data indicates a number of the contact points, and wherein the method further comprises:

based on the touch data being obtained while the external input device is connected via the communication circuitry to the electronic device, comparing the number of the contact points indicated by the touch data with a predetermined number indicated by the predetermined touch data; and based on the number of the contact points being identified as corresponding to the predetermined number, identifying the position and the size.

13. The method of claim 9, further comprising:

determining the first portion of the display area of the display; and receiving, via the second portion of the display area from among the first portion of the display area and the second portion of the display area, a touch input.

14. The method of claim 9, further comprising:

based on the arrangement of the contact points being identified as different from the predetermined arrangement, refraining from determining the first portion of the display area; and displaying, in the first portion of the display area and the second portion of the display area, the screen.

15. The method of claim 9, further comprising:

connecting, via the communication circuitry, to the external input device;

receiving, using the communication circuitry, from the external input device, a signal including data regarding an input; and based on receiving the signal, performing a function corresponding to the input.

16. The method of claim 9, further comprising:

based on the first portion of the display area being determined while the screen is displayed in the first portion of the display area and the second portion of the display area, displaying, in the second portion of the display area from among the first portion of the display area and the second portion of the display area, the screen by changing a size of the screen from a first size to a second size smaller than the first size.

17. A non-transitory computer-readable storage medium storing one or more programs, the one or more programs comprising instructions, when executed individually or collectively by at least one processor of an electronic device comprising communication circuitry and a display including a touch sensor, cause the electronic device to perform operations, the operations comprising:

obtaining, via the touch sensor, touch data;

based on the touch data being obtained while an external input device is connected via the communication circuitry to the electronic device, comparing an arrangement of contact points indicated by the touch data with a predetermined arrangement indicated by predetermined touch data registered with respect to the external input device;

based on the arrangement of the contact points being identified as corresponding to the predetermined arrangement, identifying a position of the external input device on the display in accordance with the touch data and size of the external input device registered with respect to the external input device;

determining a first portion of a display area of the display covered by the external input device in accordance with the position and the size;

displaying, in a second portion of the display area different from the first portion of the display area, a screen; and refraining from displaying, in the first portion of the display area, a screen.

18. The non-transitory computer-readable storage medium of claim 17, wherein the operations further comprise:

based on the arrangement of the contact points being identified as corresponding to the predetermined arrangement, determining the first portion of the display area in accordance with positions of the contact points indicated by the touch data.

19. The non-transitory computer-readable storage medium of claim 17, wherein the first portion of the display area is positioned between the second portion of the display area and a third portion of the display area, and wherein the operations further comprise:

displaying, in the second portion of the display area and the third portion of the display area, the screen.

20. The non-transitory computer-readable storage medium of claim 17, wherein the touch data indicates a number of the contact points, and wherein the operations further comprise:

based on the touch data being obtained while the external input device is connected via the communication circuitry to the electronic device, comparing the number of the contact points indicated by the touch data with a predetermined number indicated by the predetermined touch data; and based on the number of the contact points being identified as corresponding to the predetermined number, identifying the position and the size.

* * * * *